United States Patent
Saputro et al.

(10) Patent No.: US 7,546,479 B2
(45) Date of Patent: Jun. 9, 2009

(54) ROBUST POWER SEQUENCING MANAGEMENT SOLUTION FOR NOTEBOOK COMPUTERS

(75) Inventors: Stephanus Saputro, Austin, TX (US); Guangyong Zhu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 495 days.

(21) Appl. No.: 11/438,578

(22) Filed: May 22, 2006

(65) Prior Publication Data
US 2007/0271478 A1 Nov. 22, 2007

(51) Int. Cl.
*G06F 1/26* (2006.01)
(52) U.S. Cl. ...................................... 713/330; 361/166
(58) Field of Classification Search ................. 713/330; 361/166
See application file for complete search history.

(56) References Cited

U.S. PATENT DOCUMENTS

| | | | | |
|---|---|---|---|---|
| 4,358,750 A | * | 11/1982 | Webster | ..................... 340/429 |
| 5,424,903 A | * | 6/1995 | Schreiber | ..................... 361/166 |
| 6,693,410 B1 | * | 2/2004 | Terrien | ..................... 323/274 |
| 6,867,627 B1 | * | 3/2005 | Murtagh | ..................... 327/158 |
| 2003/0056125 A1 | | 3/2003 | O'Conner et al. | |
| 2003/0105984 A1 | | 6/2003 | Masuyama et al. | |
| 2007/0079162 A1 | * | 4/2007 | Mundada et al. | ............ 713/330 |

* cited by examiner

*Primary Examiner*—Thuan N Du
(74) *Attorney, Agent, or Firm*—Haynes and Boone, LLP

(57) ABSTRACT

For sequencing of power rails, a plurality of switches, which operate independently of each other, are operable to control delivery of power from an input power rail to an output power rail. The delivery of the power is controlled by a control input. A time delay circuit is operable to delay the control input by a time period. An input discrete component, coupled in series with the delay circuit, is configurable to adjust the time period. A fast discharge circuit is enabled to override the time period on a trailing edge of the output power rail. A discharge circuit that is coupled to the output power rail includes an output discrete component, the component being selectable to control a decay rate of the output power rail.

17 Claims, 4 Drawing Sheets

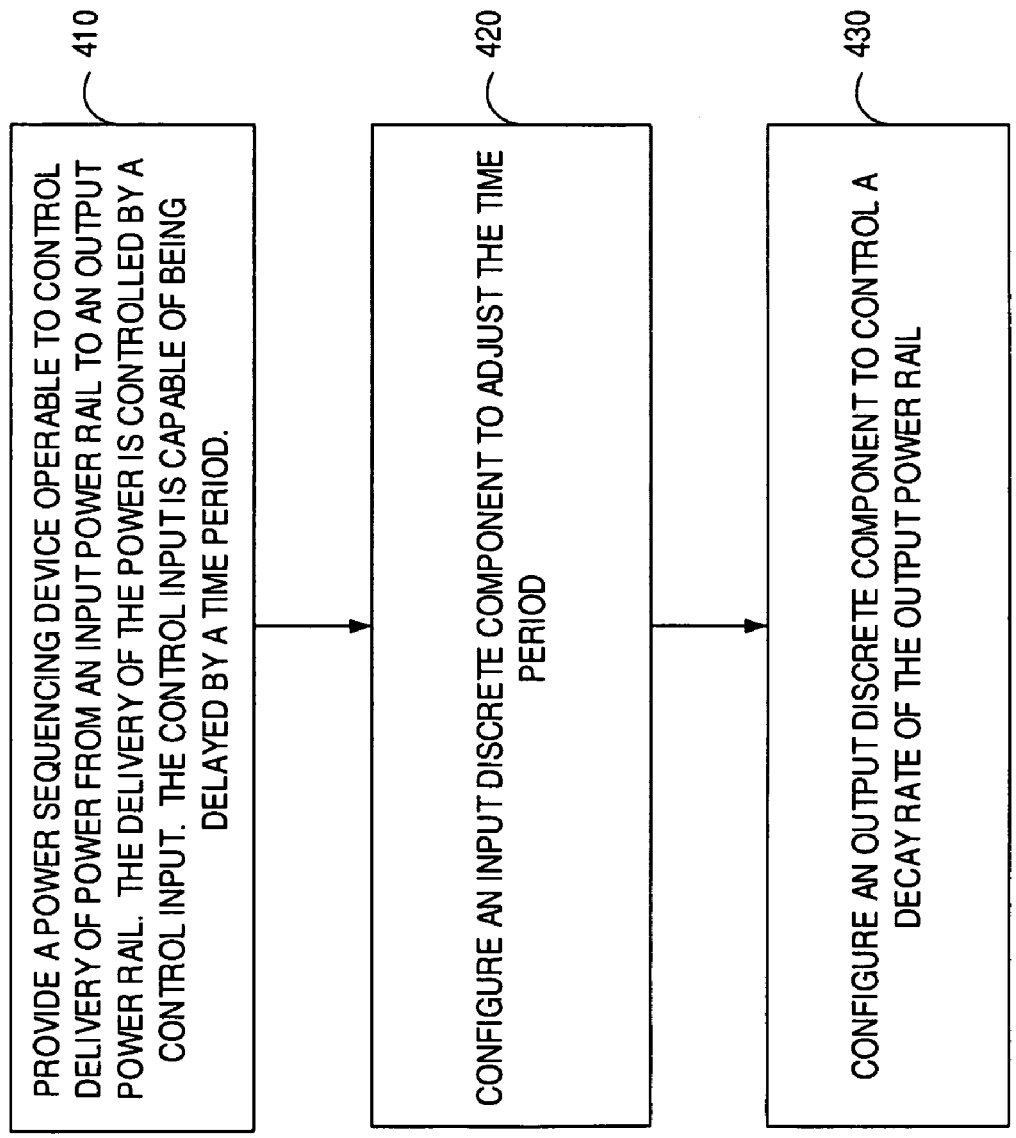

ROBUST POWER SEQUENCING MANAGEMENT SOLUTION FOR NOTEBOOK COMPUTERS

BACKGROUND

The present disclosure relates to the field of power supply systems, and more particularly to controlling the power provided to an information handling system.

As the value and use of information continues to increase, individuals and businesses seek additional ways to acquire, process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, entertainment, and/or global communications. In addition, IHSs may include a variety of hardware and software components that may be configured to process, store, and communicate information and may include one or more computer systems, data storage systems, and networking systems.

To reduce power consumption, an IHS may be placed into different activity states or operational states with each state differing in levels of power consumption. Many components of the IHS, such as processors, application specific integrated circuit (ASIC) chips and chipsets, graphic controllers and similar others, utilize separate power rails. The power rails may have standard voltages such as 12V, 5V, 3.3V, 2.5V and 1.8V. One power rail may be derived from another. For example, a S0 power rail which is used while operating in a S0 (active) power state may be derived from a S3 power rail which may be used while operating in a S3 (suspend) power state and/or while operating in the S0 state. To maintain proper operation, manufacturers of these IHS components typically require the plurality of power rails to operate in compliance with predefined power up and power down sequences for each power rail. Failure to maintain compliance with the predefined power up and power down sequences may generally result in a latch up failure of logic circuits and/or may result in an unsafe, over current condition.

Presently, it is common to develop manufacturer and/or chipset specific power sequence circuits. These power sequence circuits are typically customized for each application by selecting appropriate values for tens even hundreds of discrete components such as a resistor (R) and capacitor (C) elements to control the power sequencing. Thus, changes in the IHS platform such as changes in the chipset components used in the IHS typically results in redesigning the power sequence circuits, which increases costs and introduces time delays in introducing new products.

Therefore, a need exists for providing increased flexibility in power sequencing applications. Accordingly, it would be desirable to provide for power sequencing one or more components of an IHS, absent the disadvantages found in the prior methods discussed above.

SUMMARY

The foregoing need is addressed by the teachings of the present disclosure, which relates to improved power sequencing of power rails. According to one embodiment, a plurality of switches, which operate independently of each other, are operable to control delivery of power from an input power rail to an output power rail. The delivery of the power is controlled by a control input. A time delay circuit is operable to delay the control input by a time period. An input discrete component, coupled in series with the delay circuit, is configurable to adjust the time period.

BRIEF DESCRIPTION OF THE DRAWINGS

FIG. 4 is a flow chart illustrating a method for controlling power rails, according to an embodiment.

DETAILED DESCRIPTION

Figure 1:
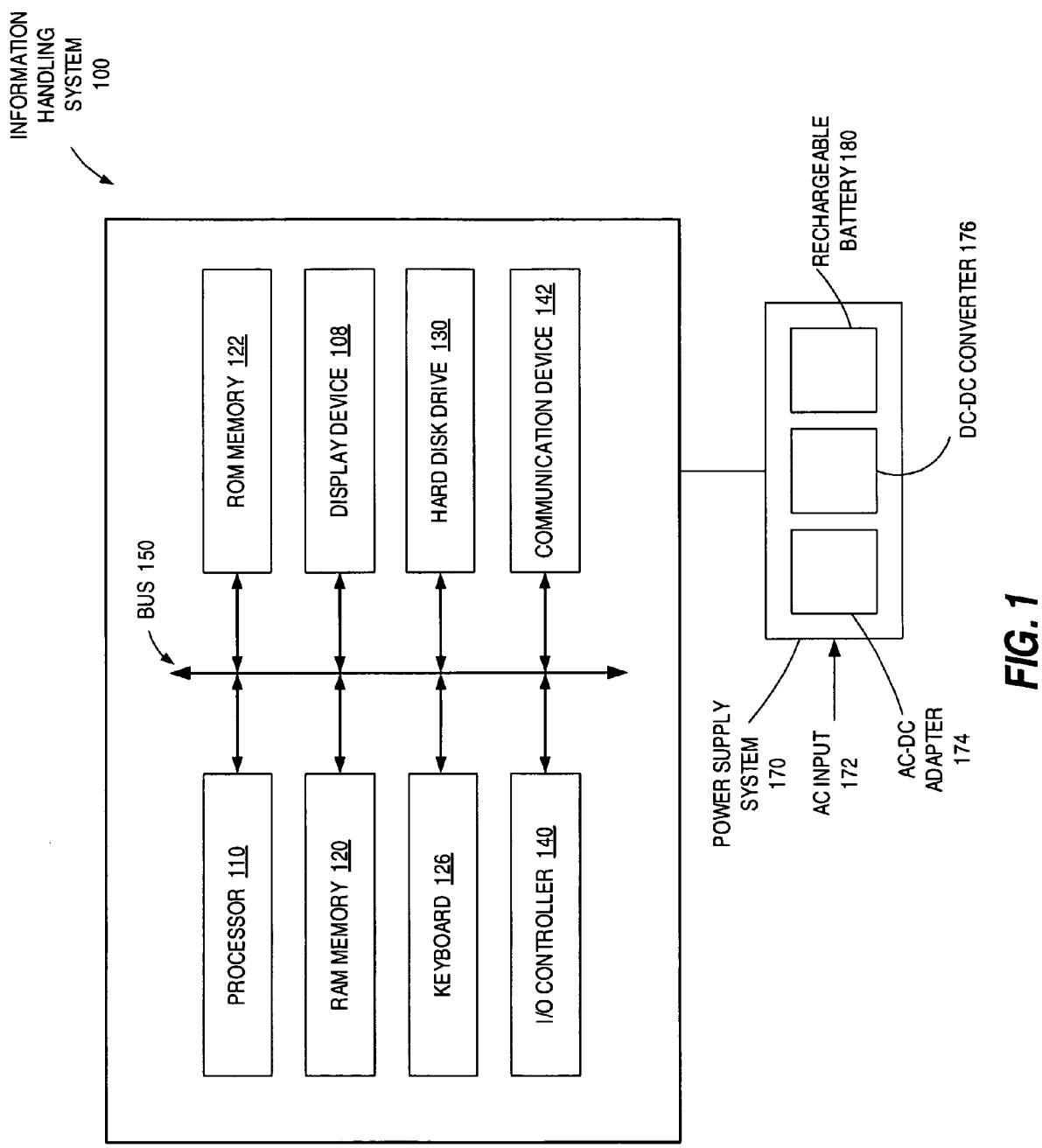
FIG. 1 illustrates a block diagram of an IHS, according to an embodiment.

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various circuits, devices, boards, cards, modules, blocks, and/or components described herein may be implemented as hardware (including discrete components, integrated circuits and systems-on-a-chip 'SOC'), firmware (including application specific integrated circuits and programmable chips) and/or software or a combination thereof, depending on the application requirements.

As described earlier, manufacturers of many components used in an IHS such as a processor, graphic processors, chipsets and ASIC's often specify that power rails, e.g., S0 and S3 rails, operate in compliance with predefined power up and power down sequences. Thus, it is common to develop manufacturer and/or chipset specific power sequence circuits. Any changes in the IHS components often results in re-designing the power sequence circuits. Therefore, a need exists for an improved method and system to provide flexibility in adapting to changes in the IHS components, while achieving compliance with the power up and power down sequencing specifications. According to one embodiment, a method and system for sequencing of power rails, a plurality of switches, which operate independently of each other, are operable to control delivery of power from an input power rail to an output power rail. The delivery of the power is controlled by a control input. A time delay circuit is operable to delay the control input by a time period. An input discrete component, coupled in series with the delay circuit, is configurable to adjust the time period. A fast discharge circuit is enabled to override the time period on a trailing edge of the output power rail. A discharge circuit that is coupled to the output power rail includes an output discrete component, the component being selectable to control a decay rate of the output power rail.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the IHS may be a personal computer, including notebook computers, servers, personal digital assistants, cellular phones, gaming consoles, a network storage device, or any other suitable device and may vary in size, shape, performance, functionality, and price. The IHS may include random access memory (RAM), one or more processing resources such as central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to receive/transmit communications between the various hardware components.

FIG. 1 illustrates a block diagram of an IHS 100, according to an embodiment. The IHS 100 includes a processor 110, a system RAM 120 (also referred to as main memory), a nonvolatile memory (NVM) 122 memory, a display device 108, a keyboard controller 126, and an I/O controller 140 for controlling various other input/output devices. For example, the I/O controller 140 may include a cursor device controller and/or a serial I/O controller. It should be understood that the term "information handling system" is intended to encompass any device having a processor that executes instructions from a memory medium.

The IHS 100 is shown to include a hard disk drive 130 connected to the processor 110, although some embodiments may not include the hard disk drive 130. In a particular embodiment, the IHS 100 may include additional hard disks. The processor 110 communicates with the system components via a bus 150, which includes data, address and control lines. In one embodiment, the IHS 100 may include multiple instances of the bus 150. In an exemplary, non-depicted embodiment, not all devices shown may be directly coupled to the bus 150. The multiple instances of the bus 150 may be in compliance with one or more proprietary standards and/or one or more industry standards such as PCI, PCIe, ISA, USB, SMBus, and similar others.

In a particular embodiment, the IHS 100 receives power from a power supply system 170 that includes one or more power devices such as an alternating current (AC) to direct current (DC) adapter 174, a DC to DC converter 176, and a rechargeable battery 180. The power supply system 170 receives an AC input 172 such as 120/240 volts from an electrical wall outlet. The power supply system 170 includes the AC-DC adapter 174 for converting the AC input 172 to a DC output. The DC-DC converter 176 receives the DC output from the AC-DC adapter 174 to provide power to a load and/or to the battery 180. The DC-DC converter 176 may also provide power to a plurality of power rails (not shown) having standard voltages such as 12V, 5V, 3.3V, 2.5V, 1.8V and similar others. When operating in a battery powered mode, the battery 180 provides the power to the load. The load may include one or more components of the IHS 100 such as the processor 110.

The processor 110 is operable to execute the computing instructions and/or operations of the IHS 100. The memory medium, e.g., RAM 120, preferably stores instructions (also known as a "software program") for implementing various embodiments of a method in accordance with the present disclosure. An operating system (OS) of the IHS 100 is a type of software program that controls execution of other software programs, referred to as application software programs. In various embodiments the instructions and/or software programs may be implemented in various ways, including procedure-based techniques, component-based techniques, and/or object-oriented techniques, among others. Software may also be implemented using C, XML, C++ objects, Java and Microsoft's .NET technology.

Figure 2:
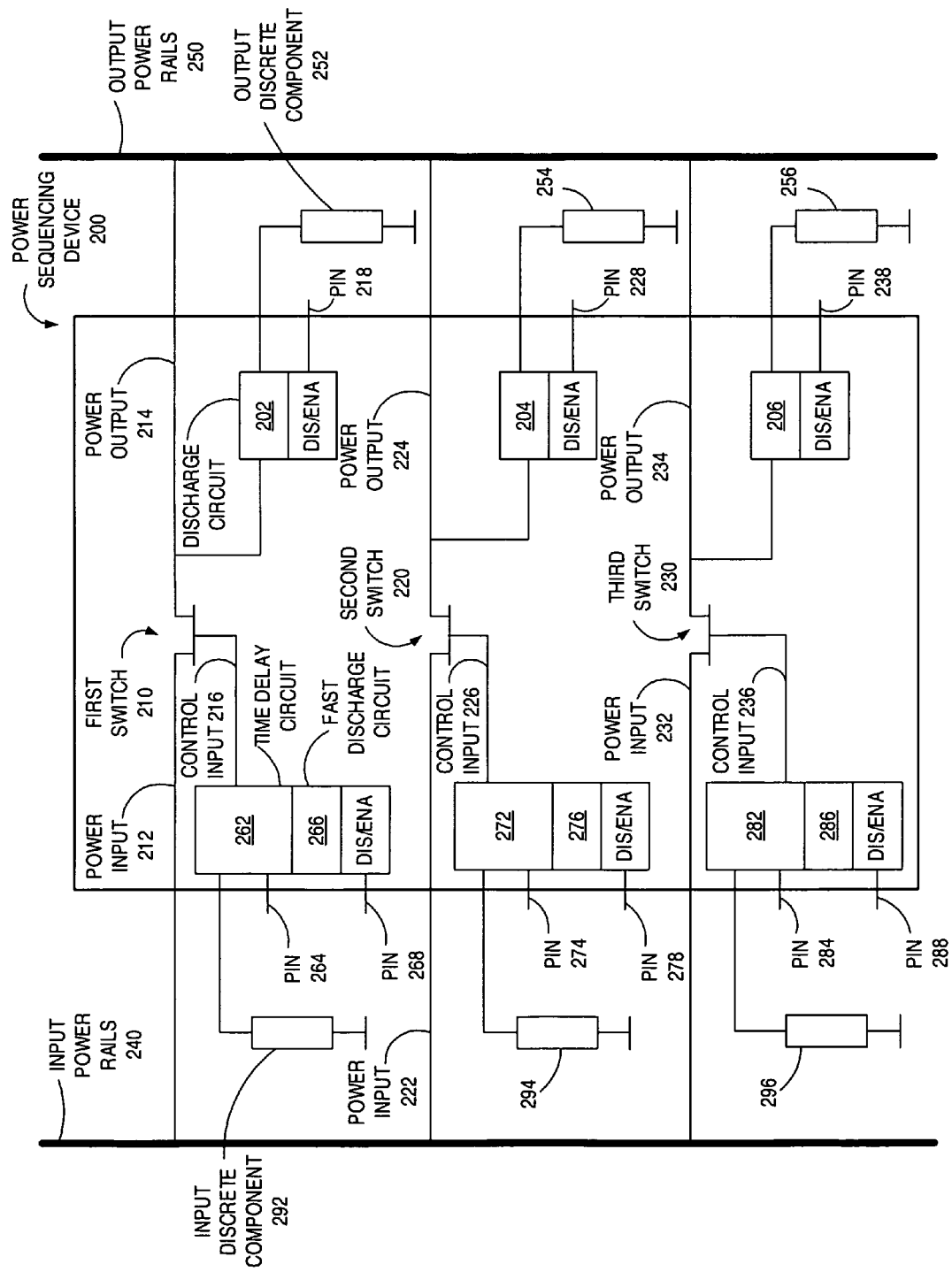
FIG. 2 illustrates a block diagram of a power sequencing device, according to an embodiment.

FIG. 2 illustrates a block diagram of a power sequencing device 200, according to an embodiment. In an embodiment, the power sequencing device 200 includes a plurality of switches, which operate independently of each other. In the depicted embodiment, the plurality of switches include a first switch 210, a second switch 220, and a third switch 230. In an alternative embodiment, the plurality of switches may include less number of switches or more number of switches compared to the three shown. Each one of the plurality of switches 210, 220 and 230 is operable control delivery of power from a corresponding input power rail to an output power rail. That is, each one of the plurality of switches 210, 220, and 230 may be switched on or off to enable or disable the delivery of power from corresponding input power rails 212, 222 and 232 (included in a plurality of input power rails 240) to the corresponding output power rails 214, 224 and 234 (included in a plurality of output power rails 250). The delivery of the power is controlled by corresponding control inputs 216, 226 and 236. The control inputs 216, 226 and 236 may be provided by a controller such as the keyboard controller 126 described with reference to FIG. 1. In an embodiment, the control inputs 216, 226 and 236 may be received from the controller via pins 264, 274 and 284 respectively. In a particular embodiment, the power sequencing device 200 is operable to control variables such as time and voltages associated with the plurality of power rails. Additional details of the time and voltage related control functions performed by the power sequencing device 200 are described with reference to FIG. 3.

In an embodiment, each one of the plurality of output power rails 250 is derived from a corresponding one of the plurality of the input power rails 240. In an exemplary, non-depicted embodiment, the plurality of the input power rails 240 may include 5V_SUS, 3.3V_SUS, and 1.8V_SUS power rails for powering in S3 state and the corresponding plurality of the output power rails 250 may include 5V_RUN, 3.3V_RUN, and 1.8V_RUN for powering in S0 state.

As described earlier, the control inputs 216, 226 and 236 may be received from a controller (not shown) via pins 264, 274, and 284. In the depicted embodiment, coupled in series with the control inputs 216, 226 and 236 are time delay circuits 262, 272 and 282. Coupled in series with each one of the time delay circuits 262, 272 and 282 are input discrete components 292, 294 and 296. The time delay circuits 262, 272 and 282 delay the control inputs 216, 226, and 236 by a corresponding time period. The time period is configurable based on selection of an input discrete component 292, 294 or 296. That is, each one of the input discrete components 292, 294 and 296 is selectable and/or configurable to adjust the time period associated with the corresponding control input and hence the output power rail. In a particular embodiment, the input discrete components 292, 294 and 296 are selectable to be at least one of a resistor and a capacitor. The time period may be configured to be 0 seconds by selecting a resistor having a value of 0 ohms. In an embodiment, the input discrete components 292, 294 and 296 may be programmable. That is, a value of the component may be programmed to select a particular time delay.

In the depicted embodiment, coupled in parallel with the time delay circuits 262, 272 and 282 are fast discharge circuits 266, 276 and 286. The fast discharge circuits 266, 276 and 286 may be enabled to control the time period on a trailing edge of the corresponding output power rails 214, 224 and 234. Each one of the fast discharge circuits 266, 276 and 286 may be enabled or disabled by asserting or de-asserting a fast discharge enable/disable signal on corresponding pins 268, 278 and 288. In a particular embodiment, if the fast discharge circuits 266, 276 and 286 are disabled then the trailing edge of the output power rails 214, 224 and 234, are delayed by the time period configured by the selection of the input discrete components 292, 294 and 296.

In the depicted embodiment, coupled in parallel with the power outputs 214, 224 and 234 are discharge circuits 202, 204 and 206. The discharge circuits 202, 204 and 206 control the discharge or decay slew rate of the corresponding output power rail. Once the switches 210, 220 or 230 are switched off, the corresponding power output may naturally decay due to presence of leakage paths or may be forced to decay at a controlled rate compared to the natural decay rate. In an embodiment, the controlled decay rate is achieved by including a dummy load, thereby providing a discharge path for discharging the output power rail. In a particular embodiment, the dummy load is an output discrete component having a configurable value.

In the depicted embodiment, coupled in series with each one of the discharge circuits 202, 204 and 206 are output discrete components 252, 254 and 256. Each one of the output discrete components 252, 254 and 256 is selectable and/or configurable to adjust the decay slew rate associated with the corresponding output power rail. In a particular embodiment, the output discrete components 252, 254 and 256 are selectable to be at least one of a resistor and a capacitor. In an embodiment, the output discrete components 252, 254 and 256 may be programmable. That is, a value of the component may be programmed to select a particular decay constant.

Each one of the discharge circuits 202, 204 and 206 may be enabled or disabled by asserting or de-asserting a discharge enable/disable signal on corresponding pins 218, 228 and 238. Additional details of the fast discharge function and the discharge function performed by the power sequencing device 200 are described with reference to FIG. 3.

In a particular embodiment, the power sequencing device 200 is implemented as an integrated circuit (IC) chip. That is, the switches 210, 220 and 230, the time delay circuits 262, 272 and 282, the fast discharge circuits 266, 276 and 286 and the discharge circuits 202, 204 and 206 are implemented on the same IC chip. This implementation reduces the component count while providing flexibility to customize application specific timing and voltage profiles. Discrete component count is advantageously reduced to two per pair of power rails.

In an embodiment, the power sequencing device 200 is implemented as an integrated circuit (IC) chip without the switches 210, 220 and 230 being built-in. This implementation enables the IC chip to handle increased power compared to the IC chip with built-in switches. In an embodiment, the switches 210, 220, and 230 are implemented as MOSFET switches.

Figure 3:
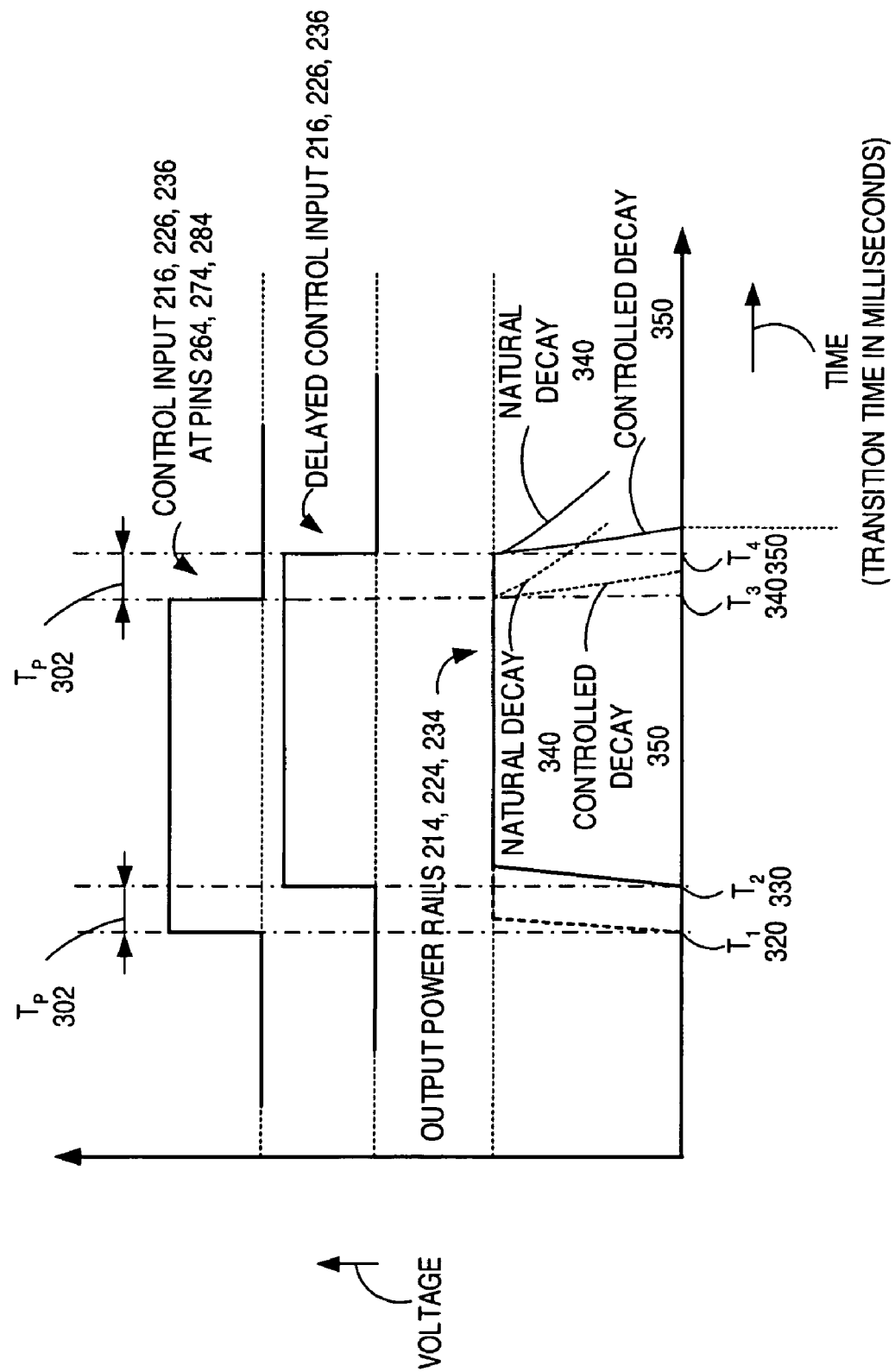
FIG. 3 illustrates a timing diagram for a power sequencing device described with reference to FIG. 2, according to an embodiment.

FIG. 3 illustrates a timing diagram for the power sequencing device described with reference to FIG. 2, according to an embodiment. As described earlier, the power sequencing device 200 is operable to perform one or more voltage and timing control functions such as monitoring voltages, controlling the turn on and turn off sequence of the plurality of output power rails 250, controlling time delays and/or timeout periods following a power event such as transition from S3 to S0 power state.

In depicted embodiment, illustrative waveforms are shown for the control input 216, 226, 236, the delayed control input 216, 226, 236 having a delay $T_p$ 302, and the output power rails 214, 224 and 234. At time $T_1$ 320 the control input 216, 226, and 236 is received at pins 264, 274 and 284. Depending on the selection of the input discrete components 292, 294 and 296, the control input 216, 226, and 236 is delayed by $T_p$ 302. If the value of $T_p$ 302 is selected to be 0 seconds, then the output power rails 214, 224 and 234 are turned on at time $T_1$ 320. If the time $T_1$ 320 is not 0 seconds, then the control inputs 216, 226, and 236 and the output power rails 214, 224 and 234 are turned on at time $T_2$ 330. At time $T_3$ 340, the control input 216, 226, 236 is turned off at the pins 264, 274, and 284. If the fast discharge circuits 266, 276, and 286 have been enabled, then the output power rails 214, 224, and 234 are switched off at $T_3$ 340, as shown by a controlled decay 350 if the discharge circuit 202, 204 or 206 is enabled or by a natural decay 340 if the discharge circuit 202, 204 or 206 is disabled. At time $T_4$ 350, if the fast discharge circuits 266, 276, and 286 have not been enabled, then the control input 216, 226, and 236 and the trailing edge of the output power rails 214, 224 and 234 are delayed by the time $T_p$ 302. The decay slew rate of the output power rails 214, 224 and 234 may be controlled or may be a natural decay. If the natural decay option is selected by disabling the discharge circuit 202, 204 or 206 (by de-asserting signal at pin 218, 228 or 238), the output power rails 214, 224 and 234 exhibit a natural decay 340 waveform. If a dummy load discharge is selected by enabling the discharge circuit 202, 204 or 206, then the power output exhibits the controlled decay 350 waveform. The controlled decay waveform 350 has a reduced discharge time compared to the natural decay 340 waveform. In an exemplary, non-depicted embodiment, the fast discharge circuit 266, 276, or 286 may be advantageously enabled to avoid a cross over of the output power rails 214, 224, 234. For example, in a particular chipset application the 5V_RUN output power rail may have to be turned off before the 3.3V_RUN output power rail and the 1.8V_RUN output power rail.

FIG. 4 is a flow chart illustrating a method for controlling power rails, according to an embodiment. At step 410, a power sequencing device operable to control delivery of power from an input power rail to an output power rail is provided. The delivery of the power is controlled by a control input. The control input is capable of being delayed by a time period, e.g., $T_p$ 302. In a particular embodiment, the power sequencing device is substantially the same as the power sequencing device 200 described with reference to FIG. 2. At step 420, an input discrete component coupled to the control input is configured to adjust the time period.

Various steps described above may be added, omitted, combined, altered, or performed in different orders. In a particular embodiment, a step 430 may be added for configuring an output discrete component that is coupled in parallel with the output power rail. A value of the output discrete component is selectable to control a decay rate of the output power rail.

The illustrative embodiments advantageously provide for empowering a user to easily adapt to changing power on and power off sequencing specifications for a plurality of power rails of an IHS by simply configuring a few discrete components. The timing aspects of the power sequencing are customizable by a single configurable input discrete component and a single configurable output discrete component output for each power output. The configurable discrete component advantageously adjusts time delays of the control input and the output power rail. Additionally, a fast discharge circuit may be enabled to rapidly discharge the power output, thereby advantageously avoiding a cross over of multiple output power rails. Portions of the power sequencing device such as the time delay circuit and the fast discharge circuit may be implemented as an integrated circuit to reduce the number of components.

In one aspect, a method for controlling power rails includes providing a power sequencing device operable to control delivery of power from an input power rail to an output power rail. The delivery of the power is controlled by a control input. A control input is capable of being delayed by a time period. An input discrete component is configurable to adjust the time period.

Several advantages are achieved by the method and system according to the illustrative embodiments presented herein. The embodiments advantageously provide for controlling power up and power down sequences for a plurality of power rails of an IHS. The timing aspects of the power sequencing are customizable by a single configurable input discrete component and a single configurable output discrete component output for each power output. The configurable discrete component advantageously adjusts time delays of the control input and the output power rail. Additionally, a fast discharge circuit may be enabled to override the time period, thereby advantageously avoiding a cross over of the output power rail and another output power rail. Portions of the power sequencing device such as the time delay circuit and the fast discharge circuit may be implemented as an integrated circuit to reduce the number of components.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power sequencing device comprising:
    a plurality of switches operable independent of each other, wherein each one of the plurality of switches is operable to control delivery of power from an input power rail to an output power rail, wherein the delivery of the power is controlled by a control input;
    a time delay circuit operable to delay the control input by a time period;
    an input discrete component coupled in series with the time delay circuit, wherein the input discrete component is selectable to adjust the time period;
    a discharge circuit coupled to the output power rail; and
    an output discrete component coupled in series with the discharge circuit, wherein the output discrete component is selectable to control a decay rate of the output power rail.

2. The device of claim 1, wherein the output discrete component is at least one of a resistor and a capacitor.

3. The device of claim 1, wherein the decay rate is accelerated by enabling the discharge circuit compared to the decay rate by disabling the discharge circuit.

4. The device of claim 1, wherein the input discrete component is at least one of a resistor and a capacitor.

5. The device of claim 1, wherein the time period is defined as a function of the input discrete component, wherein a value of the input discrete component is varied to provide a corresponding value of the time period in accordance with the function.

6. The device of claim 1, wherein the time period is configured to 0 seconds by selecting a resistor having a value of 0 ohms as the input discrete component.

7. The device of claim 1 further comprising:
    a fast discharge circuit operable to override the time period on a trailing edge of the output power rail, wherein the fast discharge circuit receives a fast discharge enable input to perform the override.

8. The device of claim 7, wherein the fast discharge enable input is enabled to avoid a cross over of the output power rail and another output power rail.

9. The device of claim 1, wherein the power input rail provides power in a S3 suspend operating state, wherein the power output rail provides power in a S0 active operating state.

10. The device of claim 1, wherein the plurality of switches and the time delay circuit are fabricated on an integrated circuit (IC) chip.

11. The device of claim 1, wherein the time delay circuit, a fast discharge circuit, and a discharge circuit are fabricated on an integrated circuit (IC) chip, wherein the plurality of switches are external to the IC chip.

12. A method for controlling power rails, the method comprising:
    providing a power sequencing device operable to control delivery of power from an input power rail to an output power rail, wherein the delivery of the power is controlled by a control input, wherein the control input is delayed by a time period;
    configuring an input discrete component coupled to the control input, wherein the input discrete component is configurable to adjust the time period;
    providing a fast discharge circuit operable to override the time period on a trailing edge of the output power rail; and
    enabling the fast discharge circuit to perform the override.

13. The method of claim 12 further comprising:
    configuring an output discrete component coupled in parallel with the power output, wherein the output discrete component is selectable to control a decay rate of the output power rail.

14. An information handling system (IHS) comprising:
    a processor; and
    a power sequencing device including:
        a plurality of switches operable independent of each other, wherein each one of the plurality of switches is operable to control delivery of power from an input power rail to an output power rail, wherein the delivery of the power is controlled by a control input;
        a time delay circuit operable to delay the control input by a time period;
        an input discrete component coupled in series with the time delay circuit, wherein the input discrete component is selectable to adjust the time period;
        a discharge circuit coupled to the output power rail; and
        an output discrete component coupled in series with the discharge circuit, wherein the output discrete component is selectable to control a decay rate of the output power rail.

15. The system of claim 14, wherein the output discrete component is at least one of a resistor and a capacitor.

16. The system of claim 14 further comprising:
a fast discharge circuit operable to override the time period on a trailing edge of the output power rail, wherein the fast discharge circuit receives a fast discharge enable input to perform the override.

17. The system of claim 16, wherein the fast discharge enable input is enabled to avoid a cross over of the output power rail and another output power rail.

* * * * *